United States Patent
Plumb et al.

(10) Patent No.: US 10,161,718 B2
(45) Date of Patent: Dec. 25, 2018

(54) SCOPE MOUNT APPARATUS FOR MANIPULATING THE MAGNIFICATION OF AN OPTICAL SCOPE

(71) Applicant: Handl Defense, LLC, Auburn, WA (US)

(72) Inventors: Francis M. Plumb, Issaquah, WA (US); Alan H. Handl, Kent, WA (US)

(73) Assignee: Handl Defense, LLC, Mesa, AZ (US)

( * ) Notice: Subject to any disclaimer, the term of this patent is extended or adjusted under 35 U.S.C. 154(b) by 0 days.

(21) Appl. No.: 15/288,388

(22) Filed: Oct. 7, 2016

(65) Prior Publication Data

US 2017/0102208 A1  Apr. 13, 2017

Related U.S. Application Data

(60) Provisional application No. 62/238,269, filed on Oct. 7, 2015.

(51) Int. Cl.
| | |
|---|---|
| *F41G 1/38* | (2006.01) |
| *G02B 23/00* | (2006.01) |
| *G02B 23/16* | (2006.01) |
| *F41G 1/54* | (2006.01) |

(52) U.S. Cl.
CPC .......... *F41G 1/38* (2013.01); *G02B 23/145* (2013.01); *G02B 23/16* (2013.01); *F41G 1/54* (2013.01)

(58) Field of Classification Search
CPC ....... F41G 1/38; F41G 11/003; G02B 23/145; G02B 23/16
USPC ................... 42/111, 124–129; 359/424, 398
See application file for complete search history.

(56) References Cited

U.S. PATENT DOCUMENTS

| | | | | |
|---|---|---|---|---|
| 2,090,656 A | * | 8/1937 | Williams | F41A 5/24 42/16 |
| 2,399,658 A | * | 5/1946 | Banker | G02B 26/023 359/489.2 |
| 2,913,826 A | * | 11/1959 | Petty | F41G 1/38 33/30.7 |
| 3,106,125 A | * | 10/1963 | Martin | G02B 15/14 352/140 |
| 3,486,432 A | * | 12/1969 | Norwood | G03B 13/02 352/171 |
| 5,434,704 A | * | 7/1995 | Connors | G02B 23/12 250/333 |
| 5,732,290 A | * | 3/1998 | Shimose | G02B 7/08 359/698 |
| 5,943,174 A | * | 8/1999 | Bryant | H01J 29/98 250/214 VT |
| 6,222,684 B1 | * | 4/2001 | Nishimura | G03B 9/14 359/699 |
| 6,724,541 B2 | * | 4/2004 | Noguchi | G02B 7/102 359/700 |

(Continued)

*Primary Examiner* — Michael D David
(74) *Attorney, Agent, or Firm* — Richard Blakely Glasgow

(57) ABSTRACT

A scope magnification adjustment apparatus for use with an optical scope. A scope mount is mounted to a optical scope by means of scope rings. A series of gears is used to rotate a twist ring on the scope to increase or decrease magnification of the optical scope. A mount gear positioned on the mount may be rotated using a lever, power drive, or worm drive mechanism. The rotation of the mount gear rotates a scope gear positioned around the scope and connected to the twist ring on the scope. As the gears rotate, the twist ring rotates and manipulates the magnification.

14 Claims, 4 Drawing Sheets

(56) References Cited

U.S. PATENT DOCUMENTS

| | | | | |
|---|---|---|---|---|
| 7,944,611 B1* | 5/2011 | Regan | F41G 1/38 |
| | | | 359/422 |
| 7,961,381 B2* | 6/2011 | Pochapsky | F41G 3/165 |
| | | | 359/353 |
| 8,314,994 B1* | 11/2012 | Thomas | G02B 23/145 |
| | | | 359/676 |
| 8,982,487 B2* | 3/2015 | Chu | G02B 27/62 |
| | | | 359/704 |
| 9,127,912 B2* | 9/2015 | Billings | F41G 1/24 |
| 9,459,440 B2* | 10/2016 | Zheng | F41G 1/38 |
| 9,494,787 B1* | 11/2016 | Bagwell | G02B 23/145 |
| 9,835,819 B2* | 12/2017 | Tang | G02B 7/04 |
| 2004/0190160 A1* | 9/2004 | Nishimura | G02B 7/021 |
| | | | 359/699 |
| 2006/0072214 A1* | 4/2006 | Kawaguchi | G02B 7/00 |
| | | | 359/704 |
| 2010/0033835 A1* | 2/2010 | Heim | F04B 43/0054 |
| | | | 359/683 |
| 2011/0041377 A1* | 2/2011 | Thomas | F41G 1/345 |
| | | | 42/120 |
| 2011/0099877 A1* | 5/2011 | Sandler | F41G 11/003 |
| | | | 42/90 |
| 2011/0310476 A1* | 12/2011 | Russ | F41G 11/004 |
| | | | 359/412 |
| 2014/0059915 A1* | 3/2014 | Sammut | F41G 1/38 |
| | | | 42/122 |
| 2015/0241161 A1* | 8/2015 | Hodgson | F41G 3/12 |
| | | | 89/14.3 |

* cited by examiner

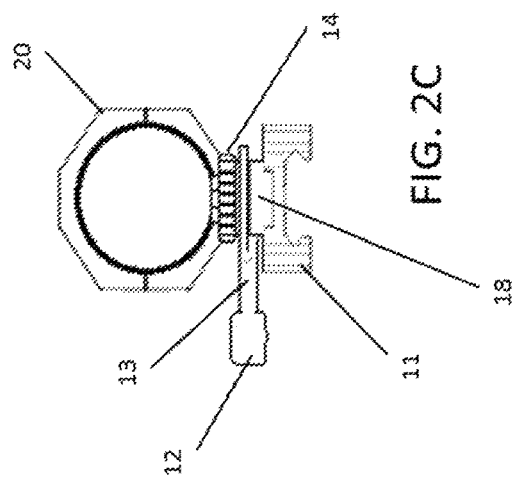
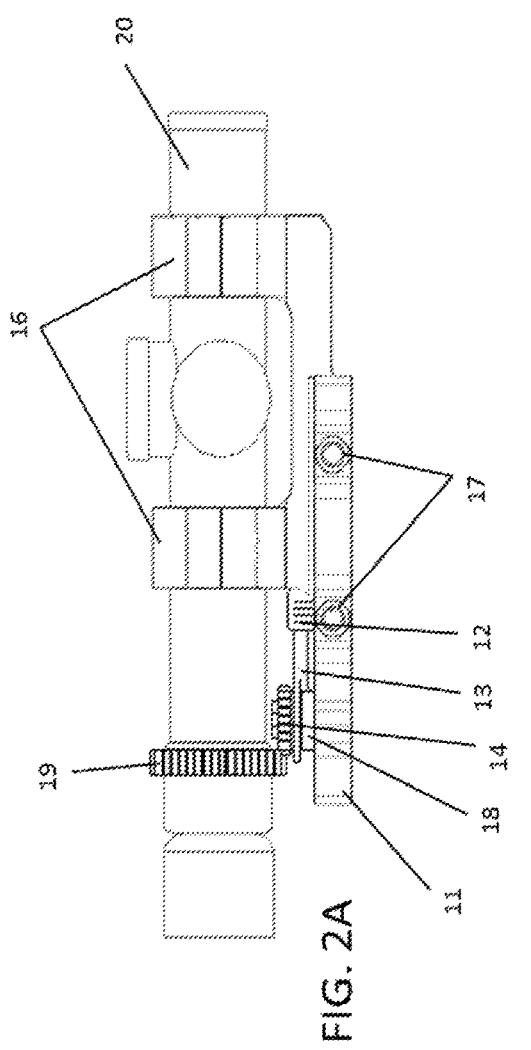
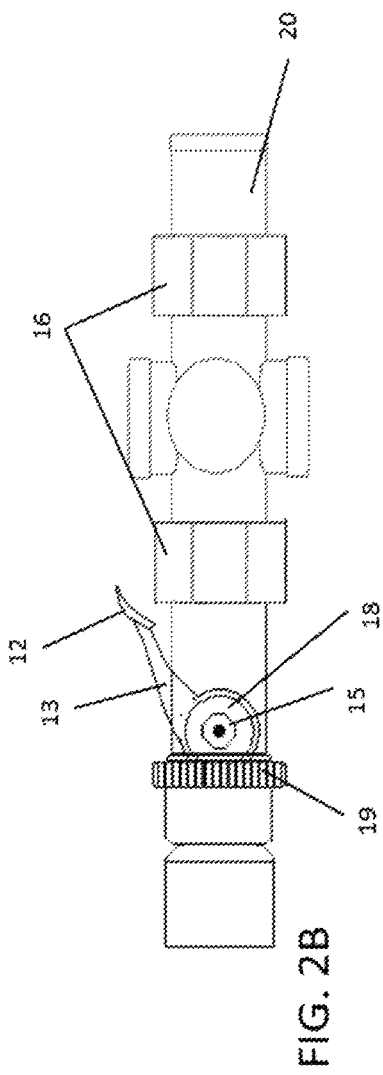

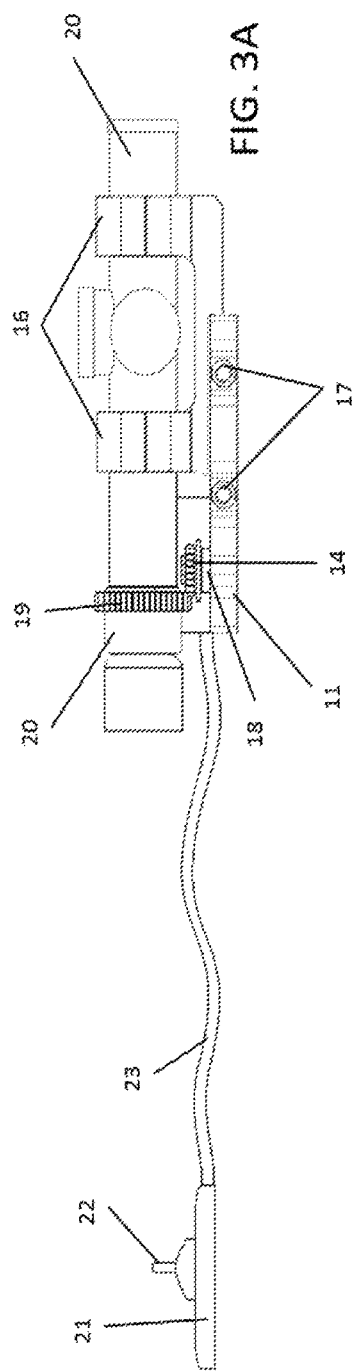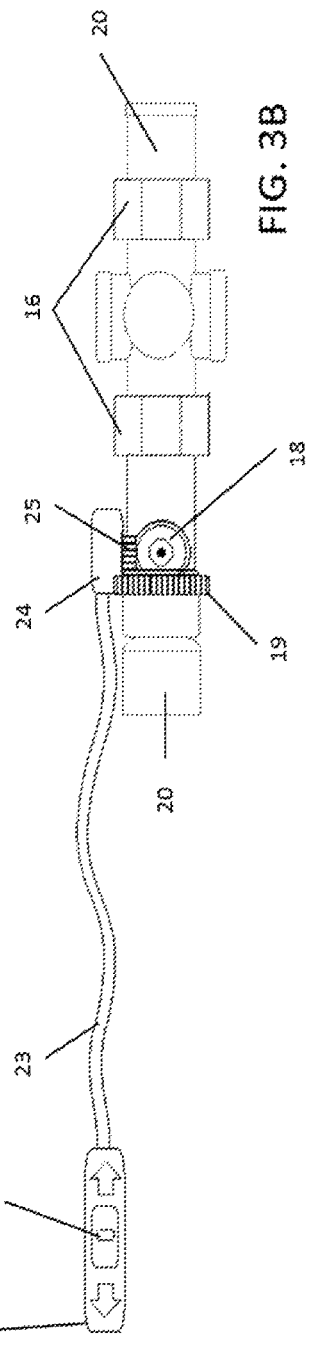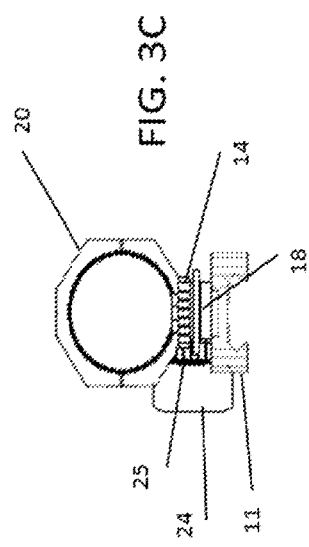

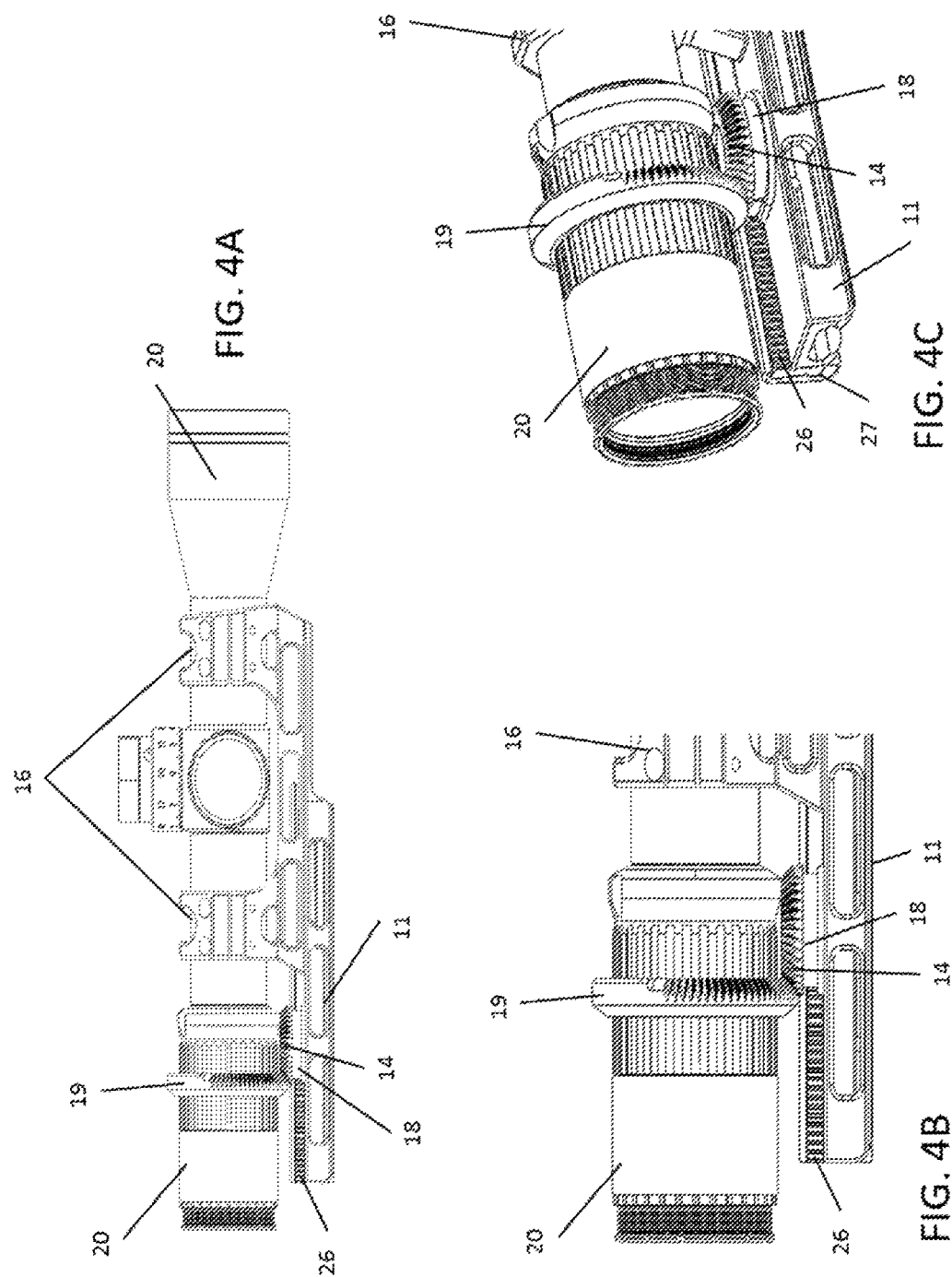

SCOPE MOUNT APPARATUS FOR MANIPULATING THE MAGNIFICATION OF AN OPTICAL SCOPE

CROSS-REFERENCE TO RELATED APPLICATIONS

This application claims the benefit of U.S. Provisional Patent Application No. 62/238,269 entitled "Variable Power Scope Quick Throw Mount" and filed on Oct. 7, 2015. Such application is incorporated herein by reference in its entirety.

STATEMENT REGARDING FEDERALLY SPONSORED RESEARCH OR DEVELOPMENT

Not applicable

BACKGROUND OF THE INVENTION

A scope is an optical device that is used to provide the user with an accurate aiming point. Scopes are generally classified according to the optical magnification of the scope. While some scopes are fixed magnification scopes, other scopes are variable magnification scopes, meaning that the magnification of the scope can be manipulated at any time. While scopes are generally used with a number of tools and systems, one of the most common uses for scopes is in connection with firearms, particularly rifles. While it is understood that the present invention may be used with any variable power optical device, including a telescope or night vision device, examples herein may be given with respect to firearms. The magnification of current variable power scopes is changed by manipulating a twist style ring, where twisting the ring in one direction increases the magnification and twisting the ring in the opposite direction decreases the magnification. Although the twisting rings may be easy to operate, this twisting action is not intuitive or ergonomically correct, particularly when the scope is being used with a firearm. In such a situation, shooters are required to move the firearm away from the shooting position in order to manipulate the variable power controls of a scope, which may cause the shooter to lose sight of a target or lead to other problems. The present invention overcomes these drawbacks by allowing a shooter to more easily change the magnification level while tracking a moving target and in a more ergonomically effective manner.

BRIEF SUMMARY OF THE INVENTION

The present invention is generally directed to an optical scope accessory, and more particularly to a scope adjustment apparatus. The scope mount of the present invention may be integral to a variable scope or may be removably attached to an existing variable scope. The present invention allows for the adjustment of the magnification of the variable scope in an efficient and ergonomic manner.

These and other features, objects and advantages of the present invention will become better understood from a consideration of the following detailed description of the preferred embodiments and appended claims in conjunction with drawings as described following.

BRIEF DESCRIPTION OF THE DRAWINGS

FIG. 2A is a side view of a first embodiment of the scope mount of the present invention positioned on a scope.

FIG. 2B is a top view of a first embodiment of the scope mount of the present invention positioned on a scope. For purposes of illustrating the levers positioning relative to the scope, the lever is shown as if the scope is transparent.

FIG. 2C is a front view of a first embodiment of the scope mount of the present invention positioned on a scope.

FIG. 3A is a side view of a second embodiment of the scope mount of the present invention.

FIG. 3B is a top view of a second embodiment of the scope mount of the present invention. For purposes of illustrating the power gear positioning relative to the scope, the power gear is shown as if the scope is transparent.

FIG. 3C is a front view of a second embodiment of the scope mount of the present invention.

FIG. 4A is a side view of a third embodiment of the scope mount of the present invention.

FIG. 4B is a side view of a third embodiment of the scope mount of the present invention showing the worm drive.

FIG. 4C is a perspective view of a third embodiment of the scope mount of the present invention showing the worm drive.

DETAILED DESCRIPTION OF THE INVENTION

Figure 1:
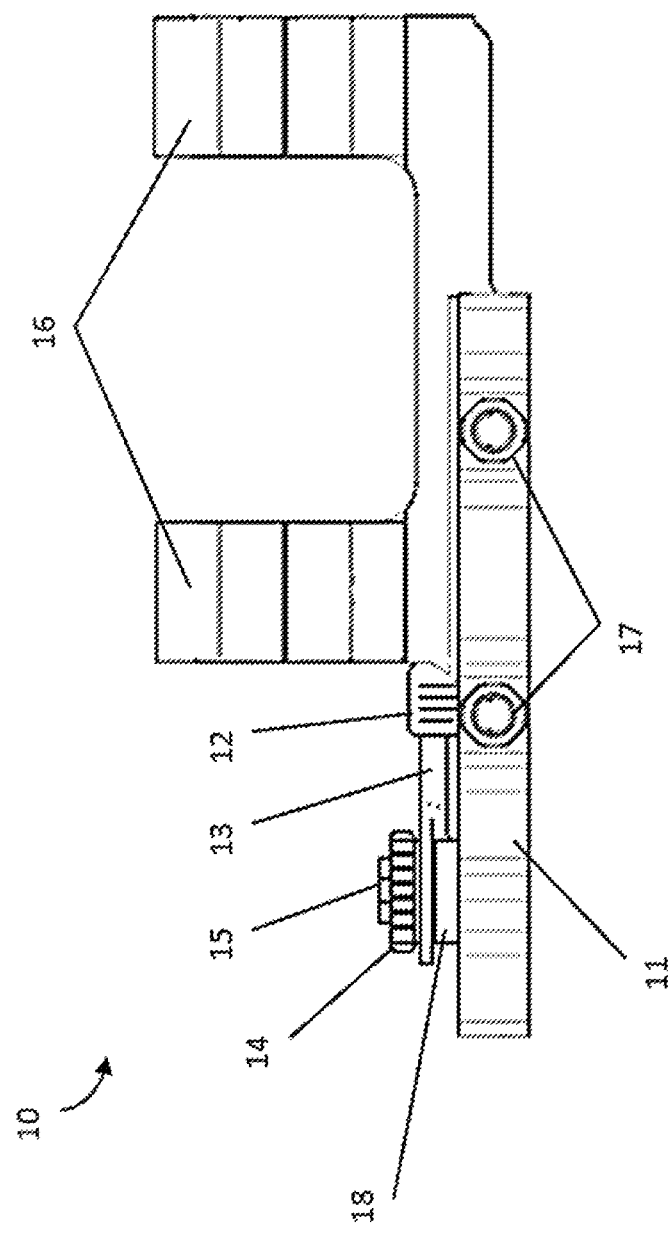
FIG. 1 is a side view of a first embodiment of the scope mount of the present invention.

The present invention is generally directed to an optical scope accessory, and more particularly to a scope magnification adjustment apparatus for mounting to an optical scope. The present invention allows for the adjustment of the magnification of the variable scope in an efficient and ergonomic manner. It is generally understood that the mount of the present invention may be integral to a scope or other small arms optics or, alternatively, may be removably attached to an existing scope or other small arms optics.

Generally, the present invention employs a series of gears attached to the base of the mount to rotate a twist style ring integral to the scope, which in turn, manipulates the magnification of the optical scope. In one embodiment, the gears are rotated by means of a lever arm, while in another embodiment the gears are rotated using a battery powered gear switch. In yet another embodiment, the gears may be rotated using an alternative mechanical device, including, for example, a worm drive. In all embodiments, the mount may be permanently affixed to the optical scope by means of scope rings or may be removably attached to the optical scope via the scope rings. Thus, the present invention can be manufactured as part of the variable scope or may be retrofitted to existing scopes to provide owners with an improved adjustment mechanism. The preferred embodiments of the present invention may be described in further detail with reference to FIGS. 1-4C.

Generally, the mount 10 may employ a mechanism to rotate the gears 14, 19, which in turn will rotate the twist ring of the scope 20 such that the magnification level is manipulated. The means for rotating the gears may be a lever mechanism, a power driven gear mechanism, or a worm drive mechanism. Each of these means for rotating the series of gears will be described more fully below. The mount 10 may be removably attached to the scope 20 or may be permanently affixed to the scope 20. FIG. 1 shows one embodiment of the mount 10 detached from the scope while FIGS. 2A-2C show the same embodiment of the mount attached to the scope. FIGS. 3A-4C show different embodiments of the mount 10 attached to the scope 20 via scope mount rings 16. The mount gear 14 is positioned on the mount base 11 which is connected to scope mount rings 16 via fasteners 17 (for example, screws or bolts). The scope mount rings 16 are placed around the scope 20 such that the mount 10 is situated on the scope 20. The preferred embodiment implements two scope mount rings 16 to attach the mount 10 to the scope 20, but any number of scope mount rings 16 may be used. The scope mount rings 16 may be removably attached to the scope 20 via screws, quick detached hardware, or any other fastener known in the art. Alternatively, the scope mount rings 16 may be permanently affixed to the scope 20 via welding or other means known in the art. In one embodiment, the mount 10 is longer than the prior art scope mounts such that the means for rotating the gear, whether a lever arm or other means described below, is situated in an ergonomically efficient position.

As noted above, a lever may be used to rotate gears 14, 19, which will result in the manipulation of the optical scope magnification. FIGS. 1-2C show an embodiment of the present invention implementing a lever to manipulate the magnification of the scope 20. The lever generally consists of a post 18, lever arm 13, and lever hand 12. The post 18 is connected to the mount base 11, preferably permanently connected. One end of the lever arm 13 encircles the post 18, and the lever hand 12 is situated on the opposite end of the lever arm 13 from the post 18. The post 18 has a threaded bore in its center capable of receiving a fastener 15, such that the fastener 15 may be inserted through the mount gear 14 to rotatably secure the mount gear 14 to the post 18. The fastener 15 may, for example, be a counter-threaded bolt capable of being secured in the threaded bore of post 18. The end of the lever arm 13 secured around the post 18 is capable of rotating such that when force is applied to the lever hand 12 the lever arm 13 rotates in the direction of the force applied. The force applied to the lever hand 12 may be a pulling or pushing by the user of the optical scope 20. The rotation of the lever arm 13 causes the mount gear 14 to rotate. Because the teeth of mount gear 14 are meshed with the teeth of the scope gear 19, as the mount gear 14 rotates, the scope gear 19 also rotates when force is applied to the lever hand 12. The rotation of the scope gear 19 rotates the twist ring integral to the scope 20 such that the magnification can be manipulated. Generally, pulling the lever hand 12 in one direction will manipulate the magnification in one way (i.e. increase or decrease magnification) and pushing the lever hand 12 in the opposite direction will manipulate the magnification in the opposite way (i.e. decrease or increase magnification, respectively). The mount gear 14 and scope gear 19 can have different gear ratios to achieve different effects. For example, finer teeth may be implemented for more precise movement or larger teeth may be implemented for faster magnification.

The lever post 18 is preferably positioned on the base 11 of the mount 10 below the mount gear 14 on the underside of the optical scope 20. The lever post 18 may be mounted in a manner such that the lever arm 13 and lever hand 12 are positioned on the left side of the optical scope 20 or the right side of the optical scope 20, allowing either a right or left hand dominate user to effectively pivot the lever arm 13 by applying force to the lever hand 12. It is preferred that the lever 13 is positioned on the underside of the scope, as the positioning of the lever 13 on the underside of the scope 20 such that the lever arm 13 extends outward allows the user to change the magnification of the optical scope 20 by applying force to the lever hand 12 while in the shooting position. While the prior art requires a user to leave the shooting position to manipulate the magnification, a user of the present invention can use their supporting hand to apply force to the lever hand 12 to change the magnification power in the manner described above. The scope ring 19 can be integral to the scope 20 or it may be a separate part supplied with the scope mount 10 that is removably attached to the scope 20 by placing the scope ring 19 around the scope 20. Geared ring 19 is preferably mounted to the twist ring on the scope 20 and preferably includes a multi-piece assembly that allows the user to mount and dismount the geared ring 19 to and from the scope 20 while the mount 10 remains attached to the scope 20. This allows the user to set the parameters of use depending on whether minimum or maximum magnification is desired when the geared lever is in its most forward position. In other words, the user can interchange the geared ring 19 depending on desired use. For example, if the user desires a geared ring 19 with different size teeth, the multi-piece geared ring 19 assembly in use can be removed from the scope 20 and interchanged with a different size geared ring 19 without requiring the user to disassemble the entire mount apparatus.

In an alternate embodiment, as shown in FIGS. 3A-3C, the mount 10 may implement an electronically powered gear 25 in addition to the mount gear 14 and scope ring gear 19 to manipulate the scope magnification ring of the scope 20. The power gear 25 may be attached to a power device 24 that uses electrical power to mechanically rotate gear 25. The electrical power may come from any power source, including batteries or a power socket. Because the teeth of power gear 25 are meshed with the teeth of the mount gear 14, when power gear 25 rotates, mount gear 14 also rotates. Because the teeth of mount gear 14 are meshed with the teeth of the scope gear 19, as the mount gear 14 rotates, the scope gear 19 also rotates. As with the levered embodiment previously described, the rotation of the scope gear 19 rotates the twist ring integral to the scope 20 such that the magnification can be manipulated. The rotation direction of power gear 25 (and thus the increase or decrease in magnification of the optical scope) is dependent on the direction of a switch 22 of a power controller 21 connected to power device 24. The positioning of switch 22 in one direction will rotate the power gear 25 such that the series of gears rotates the twist ring of the scope 20 in a direction that increases magnification, while the positioning of the switch 22 in the opposite direction will rotate the power gear 25 such that the series of gears rotates the twisting ring of scope 20 in a direction that decreases magnification. The power mechanism including the power device 24, switch 22, and power controller 21 may be battery operated. Further, power controller 21 and switch 22 may be connected to power device 24 via a power cord 23. Power cord 23 may be of sufficient length to allow a user of the scope to use power controller 21 while staying in the shooting position.

In yet another embodiment of the present invention, as shown in FIGS. 4A-4C, the mount 10 may implement a worm drive assembly in addition to the mount gear 14 and scope ring gear 19 to manipulate the scope magnification ring of the scope 20. The worm drive assembly generally includes a linear shaft 27 with a threaded face 26. The linear shaft 27 is preferably positioned perpendicular to the mount base 11. The linear shaft 27 is capable of being slid back and forth along the mount base 11 in a direction parallel to the mount base 11. The threaded face 26 of the linear shaft 27 is meshed with the teeth of mount gear 14. Thus, as the linear shaft 27 slides along the mount base 11, the movement of the threaded face 26 causes the mount gear 14 to rotate. As noted above, the rotation of mount gear 14, the teeth of which are meshed with the teeth of scope gear 19, causes scope gear 19 to rotate. The rotation of scope gear 19 causes rotation of the scope twist ring, allowing manipulation of the magnification of the optical scope 20. In one embodiment, the linear shaft 27 of the worm drive assembly may be slid along the mount base 11 manually by pulling or pushing the linear shaft 27 itself. Alternatively, the linear shaft 27 may be slide along the mount base 11 by pulling or pushing a handle attached to the linear shaft (not shown). In yet another embodiment, the linear shaft 27 may be connected to a power source and may be slid along the mount base 11 using an electric motor (not shown).

The components of the present invention are preferably made of metal, but may alternatively be made of other durable materials that would be well-known to those skilled in the art. In addition, the present invention may either be an add-on product to existing variable power optical devices or a stock product with variable power optical devices.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention.

We claim:

1. An apparatus for adjusting the magnification of an optical scope comprising:
    a. a plurality of scope mount rings configured to be attached to the optical scope;
    b. a mount base attached to the plurality of scope mount rings;
    c. a rotatable mount gear positioned on the mount base;
    d. a scope gear configured to be removably attached around a twist ring of the optical scope, wherein the scope gear is meshed with the mount gear; and
    e. means for rotating the mount gear, whereby rotating the mount gear increases or decreases a magnification of the optical scope.

2. The apparatus of claim 1, wherein the means for rotating the mount gear is a lever assembly.

3. The apparatus of claim 2, wherein the lever assembly comprises a lever arm having a first end and a second end, wherein the first end of the lever arm is attached to the mount gear.

4. The apparatus of claim 3, wherein a lever hand is attached to the second end of the lever arm.

5. The apparatus of claim 1, wherein the means for rotating the mount gear is a power operated gear assembly.

6. The apparatus of claim 5, wherein the power operated gear assembly comprises a power controller having a power switch, wherein the power switch has an on position and an off position.

7. The apparatus of claim 6, wherein the power operated gear assembly comprises a power gear in communication with the power switch of the power controller.

8. The apparatus of claim 7, wherein the power gear is meshed with the mount gear.

9. The apparatus of claim 1, wherein the means for rotating the mount gear is a worm drive assembly.

10. The apparatus of claim 9, wherein the worm drive assembly comprises a worm shaft, wherein the worm shaft comprises a threaded face.

11. The apparatus of claim 10, wherein the threaded face of the worm shaft is meshed with the mount gear.

12. The apparatus of claim 1, wherein the mount base is attached to the plurality of scope mount rings via a plurality of fasteners.

13. The apparatus of claim 1, further comprising a base post connected to the mount base, wherein the base post comprises a threaded internal bore.

14. The apparatus of claim 13, wherein the mount gear is secured to the base post by a fastener inserted into the threaded internal bore of the base post.

* * * * *